(12) United States Patent
Smithson

(10) Patent No.: US 7,634,822 B2
(45) Date of Patent: Dec. 22, 2009

(54) CHANGING AND TOILETING STATION

(76) Inventor: Suzy Smithson, 708 Spottswood Rd., Richmond, VA (US) 23229

( * ) Notice: Subject to any disclaimer, the term of this patent is extended or adjusted under 35 U.S.C. 154(b) by 508 days.

(21) Appl. No.: 10/569,754

(22) PCT Filed: Aug. 30, 2004

(86) PCT No.: PCT/US2004/028381

§ 371 (c)(1),
(2), (4) Date: Feb. 24, 2006

(87) PCT Pub. No.: WO2006/009561

PCT Pub. Date: Jan. 26, 2006

(65) Prior Publication Data

US 2007/0022523 A1     Feb. 1, 2007

Related U.S. Application Data

(60) Provisional application No. 60/498,776, filed on Aug. 30, 2003.

(51) Int. Cl.
*A47K 11/06* (2006.01)
(52) U.S. Cl. .................................. 4/484; 4/465; 4/476
(58) Field of Classification Search ................ 4/465, 4/476, 484
See application file for complete search history.

(56) References Cited

U.S. PATENT DOCUMENTS

| | | | |
|---|---|---|---|
| 3,063,061 A | 11/1962 | Bertram | |
| 3,203,007 A * | 8/1965 | Olson | 4/484 |
| 3,495,278 A | 2/1970 | Peters | |
| 3,950,794 A | 4/1976 | Dalton | |
| 4,155,126 A | 5/1979 | Classen | |
| 2003/0221249 A1 * | 12/2003 | Shirkey | 4/484 |

OTHER PUBLICATIONS

WIPO International Search Report Dated Dec. 22, 2005, International Patent Application No. PCT/US2004/28381, 3 pages.

* cited by examiner

*Primary Examiner*—Tuan N Nguyen
(74) *Attorney, Agent, or Firm*—Hunton & Williams LLP

(57) ABSTRACT

A portable toilet apparatus configured for use with a toilet liner is disclosed. The toilet apparatus comprises a toilet basin, and a toilet seat removably fitted to the toilet basin. The toilet seat further includes retention means for retaining the toilet liner at least partially within the toilet basin. A combination changing and toileting station is also disclosed. The combination changing and toileting station comprises a toilet assembly, and a changing table assembly removably attached to toilet assembly. The toilet assembly and changing table assembly are adjustable between a first position for use as a changing table, and a second position for use as a toileting station. A method of using a toilet liner with a portable toilet apparatus is also disclosed. The method comprises positioning the toilet liner within the toilet basin such that a first portion of the toilet liner is secured by the retention means, removing the first portion of the toilet liner from the retention means following use of the toilet apparatus, and disposing of the toilet liner. The toilet liner may comprise a diaper with an elastic edge or gusset.

23 Claims, 5 Drawing Sheets

CHANGING AND TOILETING STATION

The present invention claims priority to U.S. Provisional Application No. 60/498,776 filed Aug. 30, 2003, the contents of which are incorporated herein by reference in their entirety.

BACKGROUND OF THE INVENTION

This invention relates generally to the field of portable toilets, and more specifically to a changing and toileting station, and method of using wearable absorbent articles therein.

Child toilet training has changed considerably since disposable absorbent articles have become widely used. Parents do not begin potty training until much later, and when they do, older children are often more resistant to using a toilet. Therefore', the sooner an infant can be introduced to the use of a toilet, or toilet-like device, the likelihood increases that the child will not be as resistant to the potty training process. This situation is very similar to that observed with children that have been consistently placed in carseats starting with the first car ride home from the hospital. These children are less resistant to being placed in car seats when they are two years of age.

To speed up the child's introduction to the toilet and potty training, it may be possible to introduce these items with other staples of the child's development. For example, children are usually exposed to changing tables or stations from the time they come home from the hospital. These changing tables often remain with the child, even after they have been outgrown, as part of the child's room or nursery furniture. The constant exposure to these changing stations may offer an opportunity to provide a gradual introduction to potty training that builds on her comfort level.

In the use of portable toilets, for potty training or other uses, there are many challenges, such as, what to do with the bodily waste and where to clean the portable toilet, and how. There is a need for a safe, clean and efficient way of using portable toilets that is inexpensive and allows for easy cleaning and disposal of waste. Such a method of use may be found with the use of toilets liners, yet to be effective, such toilets must be adaptable for use with widely available liners that are not difficult to come by, specialized or costly to produce.

Accordingly, the invention provides an illustrative toilet apparatus, combination changing and toileting station, and methods of using the same, that overcome the disadvantages of known devices while offering features not present in known devices. Although certain deficiencies in the related art are described in this background discussion and elsewhere, it will be understood that these deficiencies were not necessarily heretofore recognized or known as deficiencies. Furthermore, it will be understood that, to the extent that one or more of the deficiencies described herein may be found in an embodiment of the claimed invention, the presence of such deficiencies does not detract from the novelty or non-obviousness of the invention or remove the embodiment from the scope of the claimed invention.

SUMMARY OF THE INVENTION

The invention, according to one embodiment, relates to a portable toilet apparatus configured for use with a toilet liner. The toilet apparatus comprises a toilet basin, and a toilet seat removably fitted to the toilet basin. The toilet seat further includes retention means for retaining the toilet liner at least partially within the toilet basin.

The invention, according to another embodiment, relates to a combination changing and toileting station. The combination changing and toileting station comprises a toilet assembly, and a changing table assembly removably attached to toilet assembly. The toilet assembly and changing table assembly are adjustable between a first position for use as a changing table, and a second position for use as a toileting station.

The invention, according to another embodiment, relates to method of using a toilet liner with a portable toilet apparatus having a toilet basin, a toilet seat, and retention means for retaining the toilet liner at least partially within the toilet basin. The method comprises positioning the toilet liner within the toilet basin such that a first portion of the toilet liner is secured by the retention means, removing the first portion of the toilet liner from the retention means following use of the toilet apparatus, and disposing of the toilet liner. In some embodiments, the toilet liner comprises a diaper, and the first portion comprises an elastic edge of the diaper.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF PREFERRED EMBODIMENTS

In accordance with various embodiments of the invention, the following descriptions illustrates various toileting apparatuses, combination changing and toileting apparatuses or stations, and methods for using disposable toilet liners with the various toileting apparatuses to provide for one's portable toileting needs.

Figure 1:
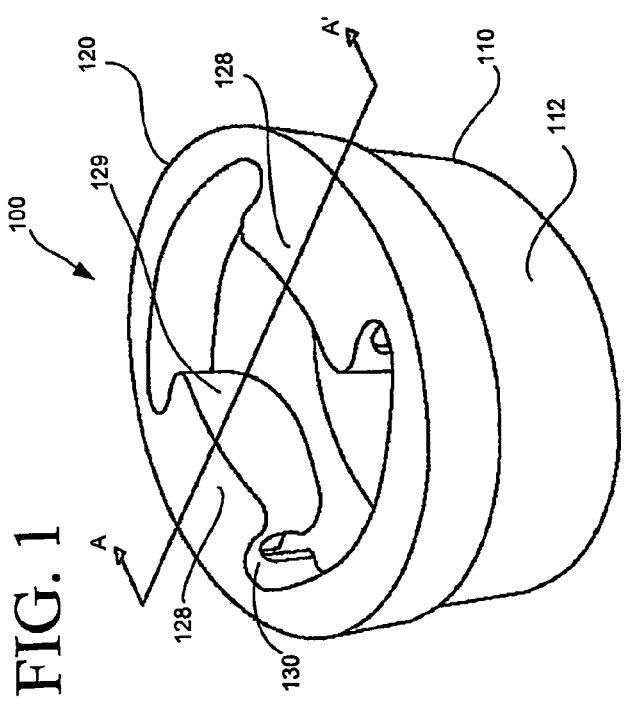
FIG. 1 is a perspective view of an illustrative toilet apparatus in accordance with one embodiment of the invention.

FIG. 1 is a perspective view of an illustrative toilet apparatus in accordance with one embodiment of the invention. As shown in FIG. 1, toilet apparatus 100 is generally comprised of a toilet basin 110, and a toilet seat 120 removably mounted to the toilet basin 110. The toilet apparatus 100 may also include a lid (not illustrated) hingedly attached to basin 110 or seat 120.

In contrast to conventional home toilets, toilet apparatus 100 does not include a flushing device or additional plumbing for the disposal of any exudates, either from urination or defecation, or other wastes that are disposed of in the toilet basin. Toilet apparatus 100 is adapted to utilize a toilet liner such that following the use of the toilet apparatus 100, any exudates that have been deposited within the liner can be disposed of by throwing the liner away. As described in more detail below, in some embodiments, the toilet apparatus 100 is adapted to use wearable absorbent articles, such as conventional diapers (either for infants or adults), as the toilet liners, which facilitates easy use of the toilet apparatus, and replenishment of much needed toilet liners when the user runs out of liners.

Figure 2:
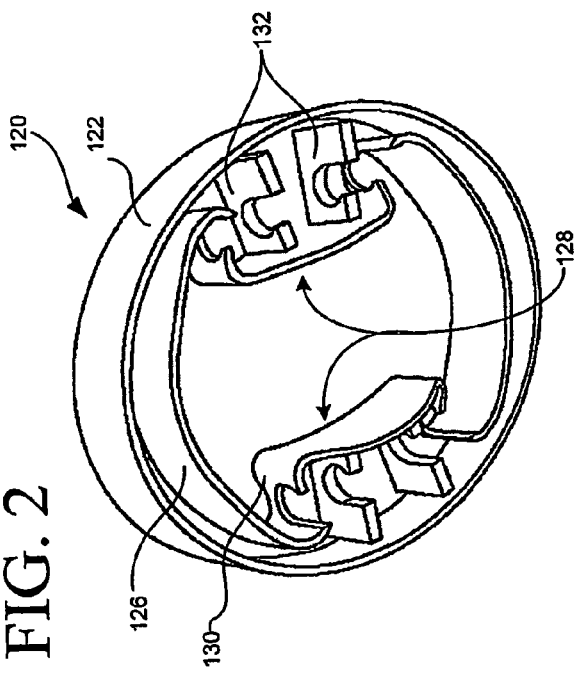
FIG. 2 is an underside perspective view of the toilet seat of FIG. 1 in further detail in accordance with one embodiment of the invention.
Figure 3:
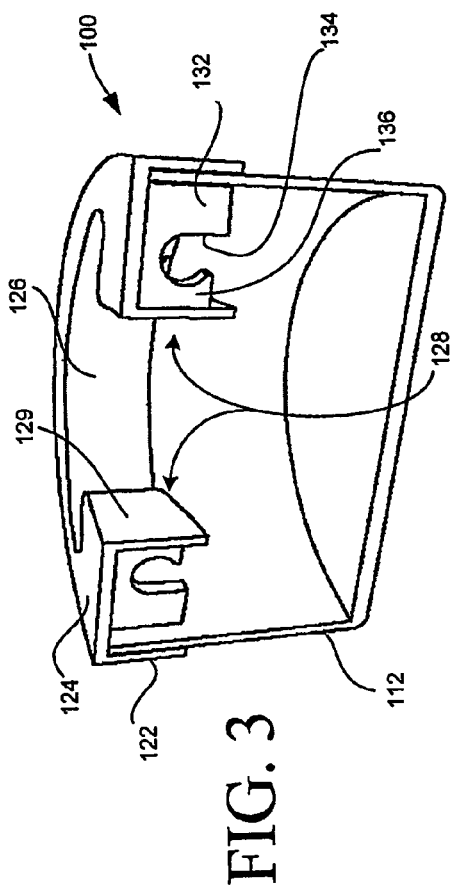
FIG. 3 is a perspective, sectional view of the toilet apparatus of FIG. 1 along A-A' in further detail in accordance with one embodiment of the invention.

As stated above, toilet seat 120 is removably mounted to the toilet basin 110. To provide further illustration, FIG. 2 is an underside perspective view of the toilet seat of FIG. 1 in further detail, and FIG. 3 is a perspective, sectional view of the toilet apparatus of FIG. 1 along A-A' in further detail. As seen in FIGS. 2-3, toilet seat 120 is generally shaped with an inverted channel cross section that is defined by an outer wall 122, a rim 124 and an inner wall 126. Although shown as oval-shaped in these embodiments, seat 120 may be provided in any suitable shape, such as elliptical, circular, or rectangular, for example. In this embodiment, a pair of side supports 128 extend, or project, inwardly from the inner wall 126 into the opening that is formed by circumference of the seat 120. Each side support 128 has a generally concave shape, with arcuate inner face 129, and opposing sidewalls 130. With the side supports 128, the opening through seat 120 appears generally dumbbell-shaped.

As shown in FIGS. 2-3, the side supports 128 also include a plurality of inner ribs 132, or tabs, that extend radially from the inner wall 126 towards the outer wall 122. To assemble the toilet apparatus 100, the top portion of the sidewall 112 of the basin 110 is slidably fitted underneath the rim 124 of the seat 120, such that sidewall 112 is adjacent to the outer wall 122 and fits within the space left between ribs 132 and outer wall 122.

Once assembled, a suitable toilet liner may be fitted within the toilet apparatus 100 for easy use as a toileting station. In this embodiment, slots 134 are formed through the sidewalls 130 and inner ribs 132, and configured to receive the edges of a suitable toilet liner, retain the toilet liner while the toilet apparatus 100 is in use, and release the edges of the toiler liner when it comes time to dispose of the liner. In some embodiments, a suitable toilet liner may comprise a wearable absorbent article, such as a diaper with elastic gussets, or edges, for frictionally engaging the channels in the side supports. Other suitable liners may include training pants with re-fastening sides, or any other absorbent article adapted for engaging the retention means of the toilet apparatus.

As best illustrated in FIGS. 2-3, the slots 134 are generally channel shaped except for an outwardly facing snare portion 136 formed on the inner face of each slot 134. The snare portions 136 are especially adapted for holding a toilet liner with elastic edges or gussets, such as a conventional diaper. In this respect, the elastic edges of the diaper would fit within the slots 134, and the snare portions 136 would be effective to make sure the elastic edges do not easily slip out of the slots 134. The snare portions 136 and slots 134 are effective to hold the elastic diaper, or other suitable liner, in position while the toilet apparatus 100 is in use.

While these embodiments have shown the side supports with only two inner ribs (not counting the sidewalls with slots), it should further be appreciated that additional ribs may be employed with the side supports to provide for greater retention of the liner in the use of the toilet apparatus. Moreover, in alternate embodiments, the side supports may be provided with a continuous channel formed therethrough, that facilitates the retention of the liner in the same manner as the slots function in the above embodiments. Furthermore, in alternate embodiments, other means for securing the toilet liner for use in the apparatus may include narrow slits, clamp-like devices, Velcro attachment devices for engaging cooperating Velcro portions on toilet liners, resilient tabs for clamping the toilet liners, for example.

Figure 5:
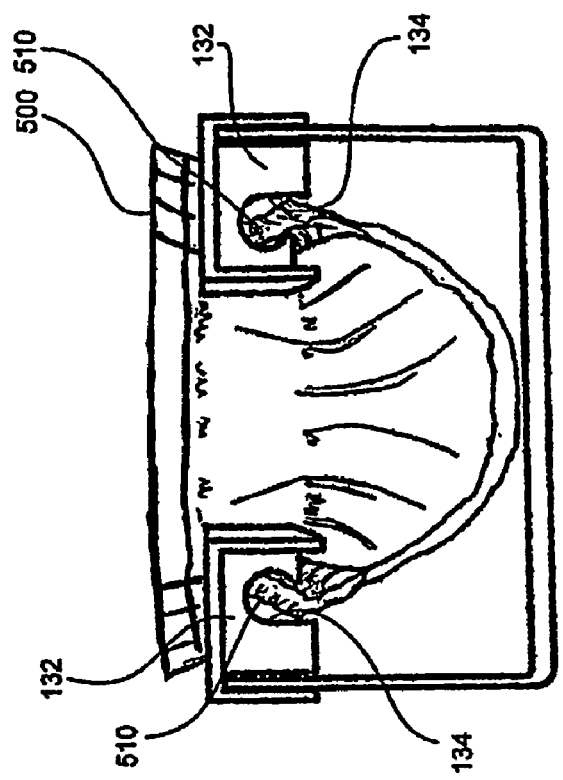
FIG. 5 is a front sectional view of the toilet apparatus of FIG. 1 along B-B' in further detail with a toiler liner in accordance with one embodiment of the invention.
Figure 4:
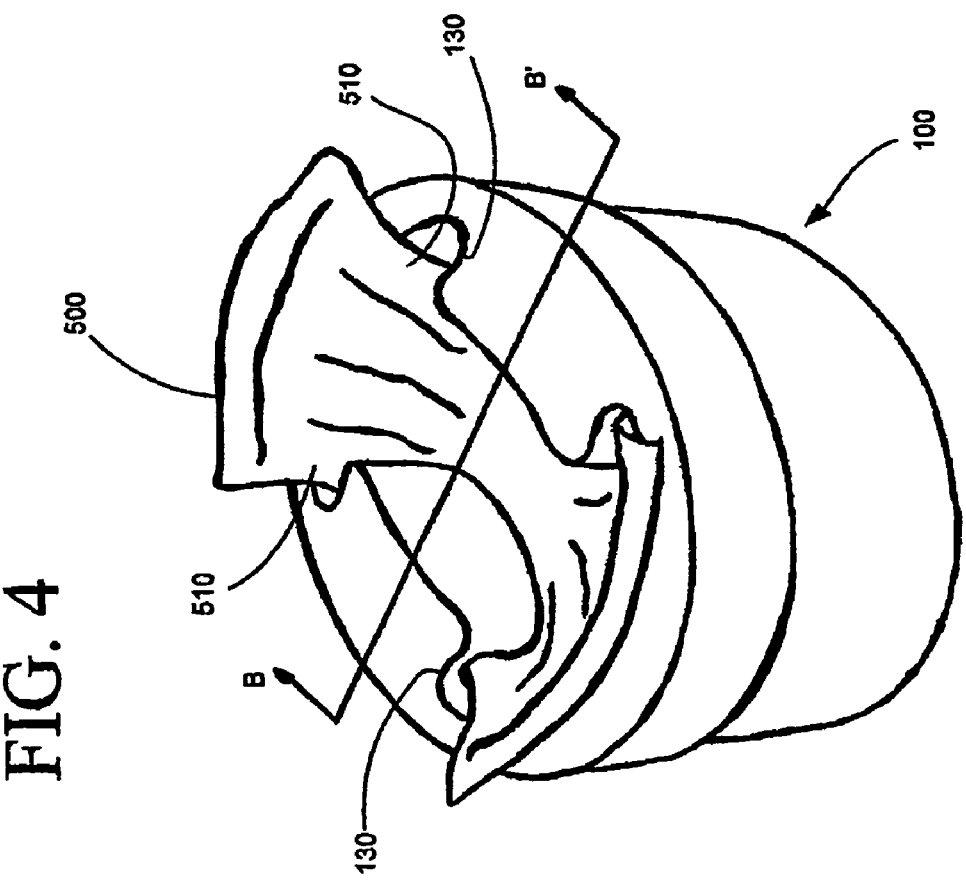
FIG. 4 is a perspective view of the toilet apparatus of FIG. 1 in further detail with a toiler liner in accordance with another embodiment of the invention.

In accordance with various embodiments of the invention, an important feature of the toilet apparatus is that it is configured such that conventional diapers, either for infants or adults, may be used as the toilet liners. Such diapers are widely available, which in turn, increases the usefulness of the present invention. To provide further illustration on the use of a conventional elastic diaper with the present toilet apparatus, FIG. 4 is a perspective view of the toilet apparatus of FIG. 1 with a diaper as the toiler liner, and FIG. 5 is a front sectional view of FIG. 4, in accordance with another embodiment of the invention. As shown in FIGS. 4-5, the diaper 500 is fitted within the apparatus 100 so that its elastic edges 510 are held in the channels formed by the slots 134 through the sidewalls 130 and inner ribs 132. The diaper 500 may be fitted within the apparatus by inserting it into the basin 110, and quickly setting the edges 510 in the channels by pushing down into the bottom of the diaper 500, and using fingertips to guide the elastic edges 510, or gussets, into position. As shown in FIGS. 4-5, excess material from the diaper 500 extends out from the basin 110 through the opening in the seat 120 adjacent to the sidewalls 130 of the side supports 128. The area adjacent these sidewalls 130 form exit channels for the excess material.

To dispose of a spent toilet liner, the caregiver can, by starting at the end of the liner closest to caregiver, simply cup the liner over any solid waste, pushing slightly down and continuing to roll the liner into a ball. This technique is familiar to many caregivers from changing and disposing of diapers. In alternate embodiments, the toilet apparatus may include a false bottom leading to an inner disposal chamber for the toilet basin. Used liners may be forced through the false bottom, into the inner disposal chamber, where they can be retrieved at a later time for final disposal. In other embodiments, the toilet apparatus may include a complimentary cabinet on which the toilet apparatus may be secured, and which has a waste receptacle stored below a false bottom in the basin to receive deposited liners and other items.

While the embodiment described above with reference to FIGS. 1-5 show toilet seat 120 and toilet basin 110 are separate components, in some embodiments, the toilet seat and basin may be formed as a single, unitary structure. Moreover, in alternate embodiments, the side supports or other liner retention devices may be formed as an integral portion of the toilet basin rather than the toilet seat.

It should be appreciated that the toilet apparatus of FIGS. 1-5 may be provided in various shapes and sizes, for example, configured for use by either infants, adults or both, and may function as a bedpan for children or adults. Accordingly, the toilet apparatus of the present invention may serve as a portable toilet using widely available toilet liners, such as diapers, would assist campers, people affected by natural disasters or other catastrophic events, and travelers, for example.

Figure 6:
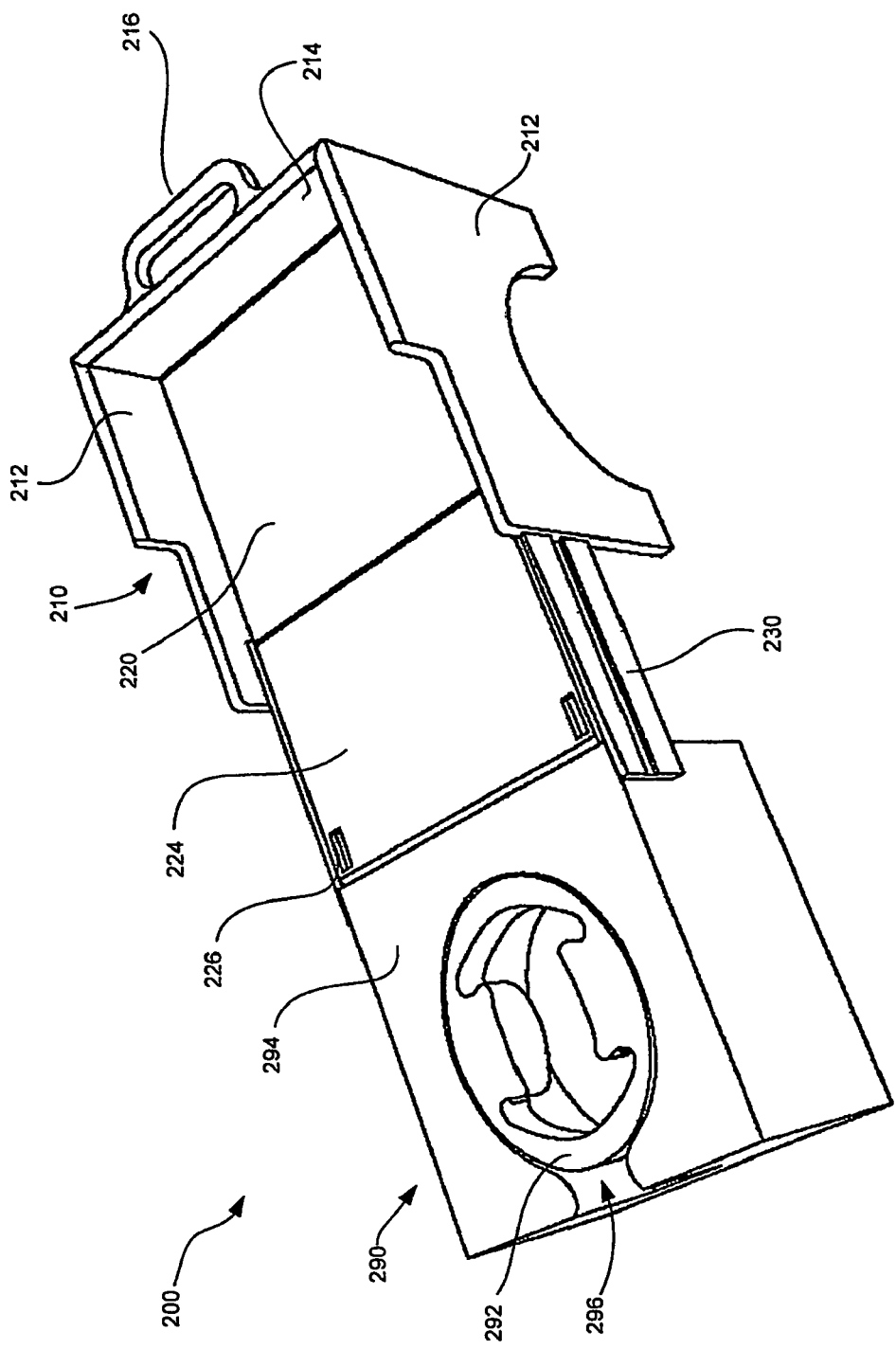
FIG. 6 is a perspective view of an illustrative changing and toileting station in accordance with one embodiment of the invention.
Figure 7:
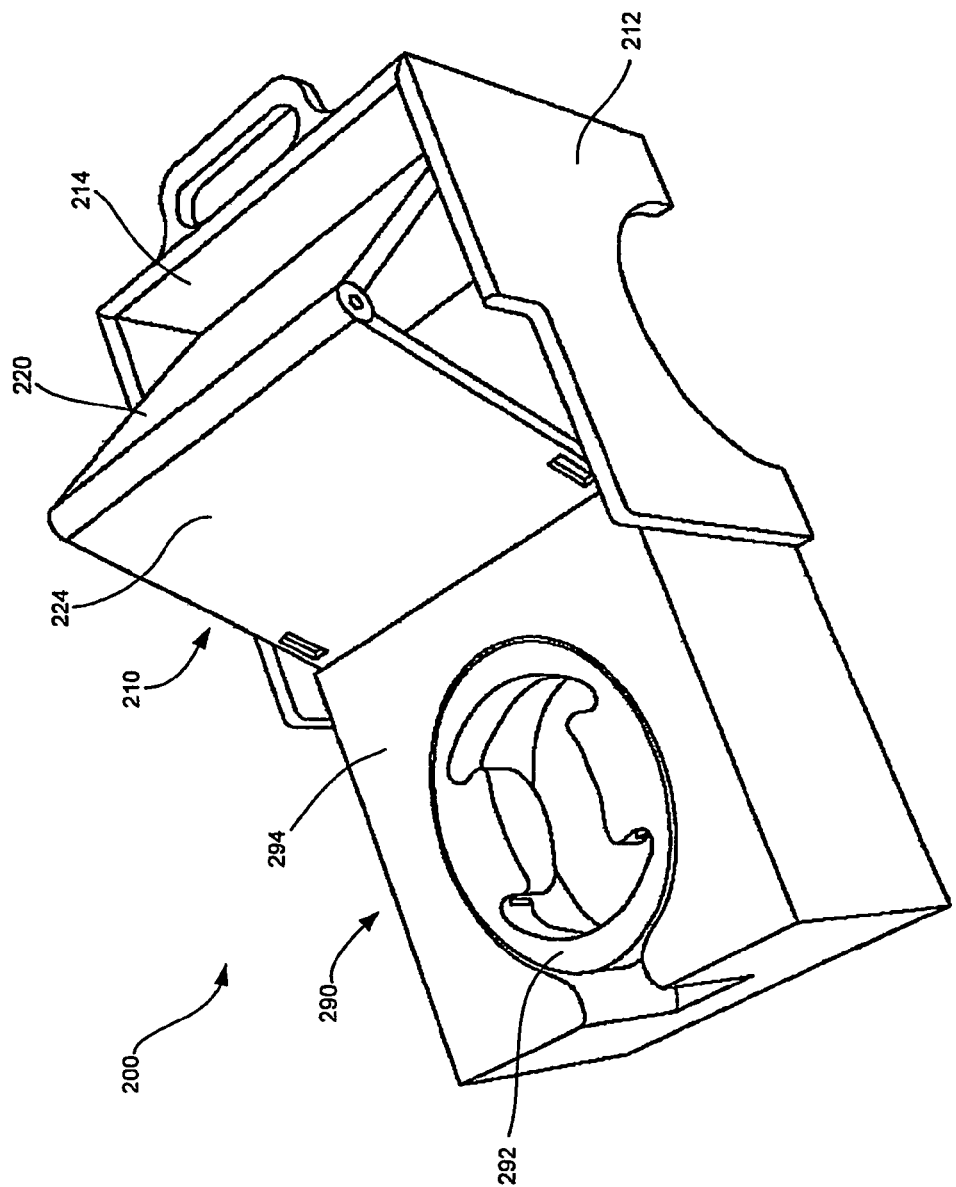
FIG. 7 is a perspective view of the changing and toileting station of FIG. 6 in further detail in accordance with one embodiment of the invention.
Figure 8:
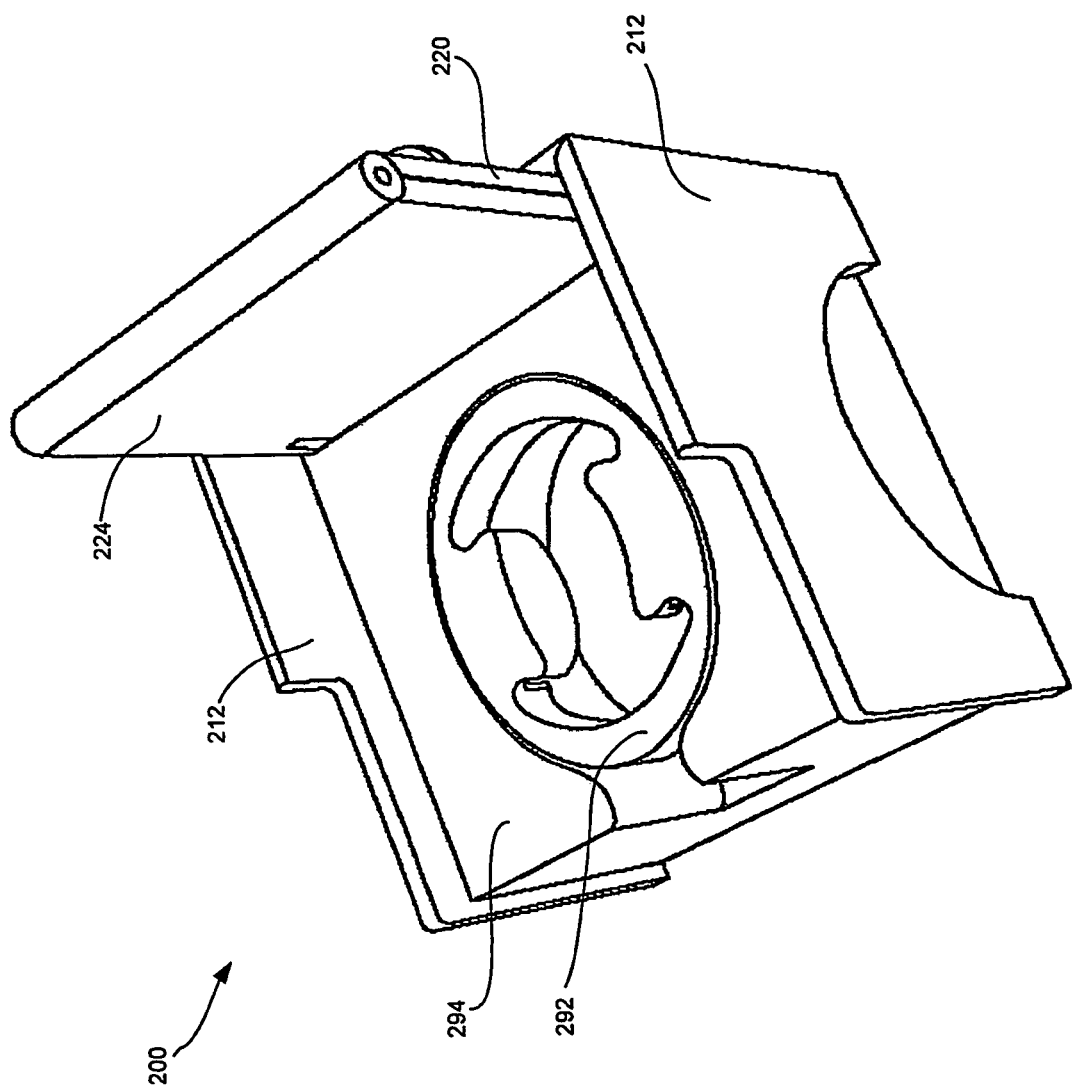
FIG. 8 is a perspective view of the combination changing and toileting station of FIG. 6 in further detail in accordance with one embodiment of the invention.

While the above embodiments of the toilet apparatus are useful for meeting portable toileting needs, further embodiments of the invention offer additional functionality with the dual operation as a toileting and changing station. FIGS. 6-8 illustrate various perspective views of an illustrative combination changing and toileting station in accordance with another embodiment of the invention. In these embodiments, the combination changing and toileting station 200 is comprised of two main portions, i.e., a changing table assembly 210 and a toilet assembly 290. The changing table assembly 210 allows a caregiver to utilize the apparatus as a changing station for an infant, for example, while the toilet assembly 290 provides a convenient, transportable toileting station for use by either adults or infants.

Referring to FIG. 6, the changing table assembly 210 includes a frame 211 comprised of sidewalls 212 and a rear wall 214. The frame 211 provides the main support for a pair of adjustable changing surfaces 220, 224. The first changing surface 220 is a rigid, panel member hingedly attached to the rear wall 214 at one end, and hingedly attached to the second changing surface 224 at the other end. Similarly, the second changing surface 224 is a rigid, panel member hingedly attached to the first changing surface 220 on one end, and hingedly attached to the toilet assembly 290 on the other end. Changing table assembly 210 further includes a pair of slide brackets 230 that connect sidewalls 212 and the toilet assembly 290.

In this embodiment, toilet assembly 290 is comprised of a toilet apparatus 292 and a toilet housing 294. It should be appreciated that toilet apparatus 292 may include the same features as toilet apparatus 100 described above, without the description of each such feature again with reference to FIGS. 6-8. As shown in FIGS. 6-8, toilet apparatus 292 is resting within a centralized cavity in housing 294. A front opening 296 in housing 294 allows the caregiver to easily remove the toilet apparatus 292 from the housing 294 when needed. Non-slip grips or pads may be attached to the bottom or sides of the toilet apparatus to prevent unnecessary slippage or movement when in use, either in the housing or when it has been removed for separate use.

The combination of the three hinged attachments—the first changing surface 220 to the rear wall 214, the first changing surface 220 to the second changing surface 224, and the second changing surface 224 to the toilet housing 294—and the connection of the sidewalls 212 and the housing 294 through slide brackets 230, allow an accordion-like adjustment of the station 200. As represented in FIGS. 6-8, the caregiver may adjust the apparatus 200 from a first position (or substantially flat configuration) more suited for a changing station (as shown in FIG. 6) to an intermediate or reclined adjustment position (as shown in FIG. 7) to a second or upright position more suited as a toileting station (as shown in FIG. 8), or vice versa. In alternate embodiments, the removable attachment between the toilet assembly and changing table assembly may utilize telescoping portions fitting into recesses in either the toilet assembly or changing table assembly. An alternative embodiment may have a means for sliding the toilet housing forward to accomplish reclinement. The station 200 may include a hinge with various latches or brake points, or other means for reclining, that allow for the incremental recline of the changing surfaces when needed to assist in positioning for better cleanup.

In changing table position (as shown in FIG. 6), the sidewalls 212 of frame 211 serve as guardrails or railings to ensure that an infant being changed thereon will not roll off or fall from the changing surface during the changing process. In addition, further safety steps may be taken by adding a safety belt or seat belt to belt attachments 226 for strapping the infant to the changing surface to avoid falls from the changing surface. To facilitate its use as a changing table, either the changing table assembly 210 or toilet apparatus 290 may be provided with an exterior or built-in cleaning article dispenser, such as for wet-wipes or other cleaning towels, for example.

In the toilet station position (as shown in FIG. 8), the changing surfaces 220, 224 are folded against one another to form a seat back for the individual using the toilet apparatus 292. Although not illustrated, it is envisioned that the folded changing surfaces 220, 224, as shown in FIG. 8, may further be folded forward to act as a lid for the toilet apparatus 292. Locking attachments may also be provided to secure the changing surfaces to the toilet housing such that the entire changing and toileting station appears as a compact case, that may be carried using handle 216.

In accordance with the invention, a caregiver can use the changing and toileting station to attend to an infant, utilizing the toilet basin or recess to keep a soiled article away from the infant's skin. Established methods of infant toilet training may be facilitated by using the various embodiments of the toilet apparatuses and combination changing and toileting stations described herein. With an older baby, the caregiver can adjust the station into a more upright position (as shown in FIG. 8), to introduce the concept of sitting on a toilet, and remove the diaper either before or after it has been soiled.

It should be appreciated that the toilet apparatus, and the various components of the combination changing and toileting station, in the various embodiments described above, may be constructed from various materials including plastic, metal, rubber or other suitable composites, for example.

While the foregoing description includes details and specificities, it is to be understood that these have been included for purposes of explanation only, and are not to be interpreted as limitations of the present invention. Modifications to the embodiments described above can be made without departing from the spirit and scope of the invention, which is intended to be encompassed by the following claims and their legal equivalents.

What is claimed is:

1. A portable toilet apparatus configured for use with a toilet liner, comprising:
   a toilet basin; and
   a toilet seat removably fitted to the toilet basin, the toilet seat having retention means for retaining the toilet liner at least partially within the toilet basin, wherein the retention means comprises a plurality of slots formed circumferentially in the toilet seat, at least one of the slots being formed in an inner rib radially extending from an inner wall of the toilet seat toward an outer wall of the toilet seat.

2. The toilet apparatus of claim 1, wherein each slot includes:
   a snare portion for facilitating the retention of the toilet liner within the toilet basin.

3. The toilet apparatus of claim 1, wherein the retention means is further adapted to receive an elastic edge of the toilet liner.

4. The toilet apparatus of claim 1, wherein the toilet liner is a wearable absorbent article.

5. The toilet apparatus of claim 1, wherein the toilet liner is a diaper.

6. A portable toilet apparatus configured for use with a toilet liner, comprising:
   a toilet basin; and
   a toilet seat removably fitted to the toilet basin, the toilet seat having retention means for retaining the toilet liner at least partially within the toilet basin, wherein the retention means comprises a plurality of slots formed circumferentially in the toilet seat, at least one of the slots being formed in a side support extending inwardly from an inner wall of the toilet seat.

7. The toilet apparatus of claim 6, wherein the toilet liner is a wearable absorbent article.

8. The toilet apparatus of claim 6, wherein the toilet liner is a diaper.

9. A portable toilet apparatus configured for use with a toilet liner, comprising:
   a toilet basin; and
   a toilet seat removably fitted to the toilet basin, the toilet seat having retention means for retaining the toilet liner at least partially within the toilet basin, wherein the retention means comprises:
   a first retention channel formed through a first side support,
   a second retention channel formed through a second side support, the first and second side supports disposed in opposition extending inwardly from the toilet seat in opposition.

10. The toilet apparatus of claim 9, wherein the first retention channel further includes a first snare portion adapted for facilitating the retention of the toilet liner at least partially within the toilet basin.

11. The toilet apparatus of claim 9, wherein the toilet liner is a wearable absorbent article.

12. The toilet apparatus of claim 9, wherein the toilet liner is a diaper.

13. A combination changing and toileting station, comprising:
   a toilet assembly; and
   a changing table assembly attached to the toilet assembly, wherein the toilet assembly and changing table assembly are adjustable between a first position for use as a changing table, and a second position for use as a toileting station, wherein the changing table assembly comprises a frame including a pair of sidewalls and a rear wall, a first changing surface have a first end and a second end, a second changing surface having a third end and a fourth end, and wherein the first end of the first changing surface is hingedly attached to the rear wall, the second end of the first changing surface is hingedly attached to the third end of the second changing surface, and the fourth end of the second changing surface is hingedly attached to the toilet assembly.

14. The combination changing and toileting station of claim 13, wherein the changing table assembly is removably attached to the toilet assembly.

15. The combination changing and toileting station of claim 13, wherein the toilet assembly comprises a toilet apparatus disposed within a toilet housing.

16. The combination changing and toileting station of claim 15, wherein the toilet apparatus is removably disposed within the toilet housing.

17. The combination changing and toileting station of claim 15, wherein the toilet apparatus includes:
   a toilet basin; and
   a toilet seat removably fitted to the toilet basin, the toilet seat having retention means for retaining a toilet liner at least partially within the toilet basin.

18. The toilet apparatus of claim 17, wherein the toilet liner is a wearable absorbent article.

19. The toilet apparatus of claim 17, wherein the toilet liner is a diaper.

20. The combination changing and toileting station of claim 13, wherein in the first position, the first changing surface and the second changing surface serve are effective to provide the changing table.

21. The combination changing and toileting station of claim 13, wherein in the first position, the sidewalls are effective to provide safety railings for the changing table.

22. The combination changing and toileting station of claim 13, wherein in the second position, the first changing surface and the second changing surface are effective to provide a seat back for the toileting station.

23. The combination changing and toileting station of claim 13, wherein in an intermediate position, the first changing surface and the second changing surface are effective to provide a reclined seat backing member.

* * * * *